(12) United States Patent
Jenson

(10) Patent No.: US 10,102,387 B2
(45) Date of Patent: Oct. 16, 2018

(54) SYSTEMS AND METHODS FOR IDENTIFYING ILLEGITIMATE ACCOUNTS BASED ON CLUSTERING

(71) Applicant: Facebook, Inc., Menlo Park, CA (US)

(72) Inventor: Daniel Adam Jenson, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/727,722

(22) Filed: Jun. 1, 2015

(65) Prior Publication Data

US 2016/0350541 A1    Dec. 1, 2016

(51) Int. Cl.
*G06F 7/04* (2006.01)
*G06F 17/30* (2006.01)
*H04N 7/16* (2011.01)
*G06F 21/60* (2013.01)

(52) U.S. Cl.
CPC ................................. *G06F 21/604* (2013.01)

(58) Field of Classification Search
CPC ............... G06Q 50/01; G06Q 30/0185; G06Q 30/0248; G06Q 20/4016; G06F 21/604
See application file for complete search history.

(56) References Cited

U.S. PATENT DOCUMENTS

| | | | |
|---|---|---|---|
| 9,332,031 B1* | 5/2016 | Kappiah | H04L 63/1483 |
| 2009/0044279 A1* | 2/2009 | Crawford | G06F 21/55 |
| | | | 726/26 |
| 2013/0135314 A1* | 5/2013 | Haggerty | G06Q 10/107 |
| | | | 345/440 |
| 2014/0040152 A1* | 2/2014 | Fang | G06Q 10/10 |
| | | | 705/319 |
| 2014/0143326 A1* | 5/2014 | Rajaram | G06Q 50/01 |
| | | | 709/204 |
| 2015/0106216 A1* | 4/2015 | Kenderov | G06Q 20/4014 |
| | | | 705/21 |

* cited by examiner

*Primary Examiner* — Trong H Nguyen
(74) *Attorney, Agent, or Firm* — Sheppard Mullin Richter & Hampton LLP

(57) ABSTRACT

Systems, methods, and non-transitory computer-readable media can acquire a plurality of accounts associated with a set of features. Each account in the plurality of accounts can be associated with a respective set of feature values for the set of features. A selection for a subset of features out of the set of features can be received. A group of clusters can be generated based on the selection for the subset of features. Each cluster in the group of clusters can include a respective collection of nodes representing at least some of the plurality of accounts. It can be determined whether a particular collection of nodes, included in at least one cluster out of the group of clusters, represents illegitimate accounts or legitimate accounts.

20 Claims, 9 Drawing Sheets

US 10,102,387 B2

SYSTEMS AND METHODS FOR IDENTIFYING ILLEGITIMATE ACCOUNTS BASED ON CLUSTERING

FIELD OF THE INVENTION

The present technology relates to the field of identifying illegitimate accounts. More particularly, the present technology relates to techniques for identifying illegitimate accounts based on clustering.

BACKGROUND

Today, people often interact with networked environments or online services. Many users of computing devices (or systems) frequently browse web sites, access online content, or otherwise use network services. Users with access to the Internet can perform online shopping, play or stream media, download software, utilize social networking services, and accomplish many other tasks. In one example, users of a social networking service or system can publish advertisements, purchase applications, give gifts, distribute promotions, or conduct various other transactions. Sometimes, an illegitimate user can attempt to publish illegitimate (e.g., fraudulent, fake, illegal, etc.) advertisements or conduct other illegitimate actions. In another example, users can provide their payment or financial information to an online service in order to fund various online activities. However, at times, an illegitimate user can attempt to illegitimately gain access to a legitimate user's information or otherwise compromise the legitimate user's account with the online service.

Accordingly, when a user of an online service, such as a social networking system, participates in various activities that involve the use of financial instruments compatible with the online service, the financial instruments of the user can sometimes be stolen, illegitimately used, or otherwise compromised. Moreover, in some cases, an illegitimate user can attempt to illegitimately avoid paying for his or her use of the online service. These and other similar concerns can reduce the overall user experience associated with online services.

SUMMARY

Various embodiments of the present disclosure can include systems, methods, and non-transitory computer readable media configured to acquire a plurality of accounts associated with a set of features. Each account in the plurality of accounts can be associated with a respective set of feature values for the set of features. A selection for a subset of features out of the set of features can be received. A group of clusters can be generated based on the selection for the subset of features. Each cluster in the group of clusters can include a respective collection of nodes representing at least some of the plurality of accounts. It can be determined whether a particular collection of nodes, included in at least one cluster out of the group of clusters, represents illegitimate accounts or legitimate accounts.

In an embodiment, generating the group of clusters can further comprise representing the plurality of accounts based on a plurality of nodes. An edge can be generated between two nodes out of the plurality of nodes when the two nodes have, within an allowable deviation, common feature values for the subset of features. At least the two nodes can be included in a particular cluster out of the group of clusters.

In an embodiment, generating the group of clusters can further comprise determining that another node has, within the allowable deviation, the common feature values for the subset of features with respect to the two nodes. Respective edges can be generated between the other node and each of the two nodes. The other node can be included in the particular cluster.

In an embodiment, determining whether the particular collection of nodes, included in the at least one cluster out of the group of clusters, represents illegitimate accounts or legitimate accounts can further comprise acquiring a first legitimacy classification for a first node in the at least one cluster. A second legitimacy classification for at least a second node, in the at least one cluster, can be acquired based on the first legitimacy classification for the first node.

In an embodiment, legitimacy classifications for all nodes in the at least one cluster can be based on the first legitimacy classification.

In an embodiment, each account in the plurality of accounts can be associated with at least one of: 1) financial information or 2) one or more financial transactions.

In an embodiment, the group of clusters can be generated based on a force-directed graph visualization process.

In an embodiment, the force-directed graph visualization process can include a Fruchterman-Reingold algorithm.

In an embodiment, the set of features can include at least one of an advertisement title feature, an advertisement quantity feature, an account age feature, a media identifier feature, an advertisement purchasing amount feature, a domain feature, a country Internet Protocol (IP) feature, a credit card feature, a country comparison feature, or a source Internet Protocol (IP) feature.

In an embodiment, the selection for the subset of features can be received dynamically. The group of clusters can be generated in real-time based on the selection for the subset of features.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
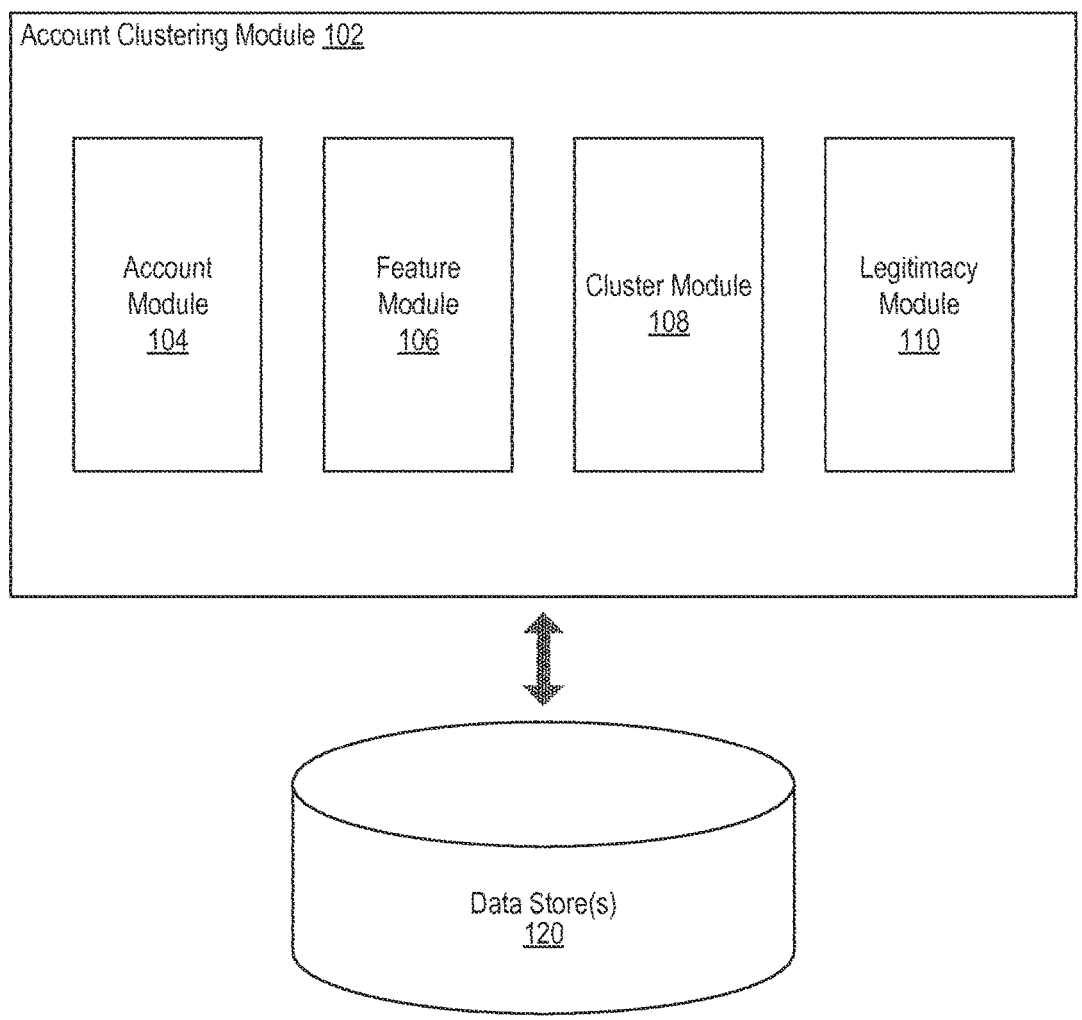
FIG. 1 illustrates an example system including an example account clustering module configured to facilitate identifying illegitimate accounts based on clustering, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Identifying Illegitimate Accounts Based on Clustering

People often conduct transactions or engage in activities that involve financial information, which can include financial instruments such as credit cards, bank accounts, electronic or digital payment services, etc. When users of computing devices utilize financial instruments in a networked environment (e.g., Internet, cellular data network, online service, social networking system, etc.), the users must often provide personal, sensitive, and/or private information about their financial instruments. In some cases, illegitimate users can attempt to perform illegal, fraudulent, or otherwise illegitimate activities in the networked environment and/or with respect to an online service. In one example, illegitimate users can steal information about the financial instruments of legitimate online service users. In another example, an illegitimate user can attempt to link a stolen financial instrument with a legitimate user's online service account. In a further example, an illegitimate user can attempt to fraudulently utilize a legitimate financial instrument associated with a legitimate user's online service account.

Furthermore, in some instances, illegitimate users can attempt to create accounts with a social networking system (or service) and utilize those accounts to conduct illegitimate activities within the social networking system. For example, an illegitimate user can create a plurality of accounts with the social networking system in hopes that at least some of those accounts will be able to successfully publish one or more advertisements illegitimately. In another example, the illegitimate user can use one or more online services, but attempt to illegitimately avoid paying for such online services.

Conventional approaches to identifying illegitimate accounts (i.e., users, entities, activities, transactions, events, and/or other incidents, etc.) typically involve manually reviewing a significant quantity of individual accounts in order to classify each of the individual accounts as being legitimate or illegitimate. However, conventional approaches are generally not scalable as the quantity of accounts requiring manual review increases. Moreover, under conventional approaches, significant amounts of manual effort and time are often times required.

Due to these or other concerns, conventional approaches can be inconvenient, ineffective, inefficient, or impractical. Therefore, an improved approach can be beneficial for addressing or alleviating various drawbacks associated with conventional approaches. The disclosed technology can identify illegitimate accounts based on (i.e., based at least in part on) clustering. Various embodiments of the present disclosure can acquire a plurality of accounts associated with a set of features. Each account in the plurality of accounts can be associated with a respective set of feature values for the set of features. A selection for a subset of features out of the set of features can be received. A group of clusters can be generated based on (i.e., based at least in part on) the selection for the subset of features. Each cluster in the group of clusters can include a respective collection of nodes representing at least some of the plurality of accounts. It can be determined whether a particular collection of nodes, included in at least one cluster out of the group of clusters, represents illegitimate accounts or legitimate accounts. It is contemplated that there can be many variations and/or other possibilities.

FIG. 1 illustrates an example system 100 including an example account clustering module 102 configured to facilitate identifying illegitimate accounts based on clustering, according to an embodiment of the present disclosure. As shown in the example of FIG. 1, the account clustering module 102 can include an account module 104, a feature module 106, a cluster module 108, and a legitimacy module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the account clustering module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the account clustering module 102 can be implemented, in part or in whole, as software running on one or more computing devices or systems, such as on a user or client computing device. For example, the account clustering module 102 or at least a portion thereof can be implemented as or within an application (e.g., app), a program, or an applet, etc., running on a user computing device or a client computing system, such as the user device 710 of FIG. 7. In another example, the account clustering module 102 or at least a portion thereof can be implemented using one or more computing devices or systems that include one or more servers, such as network servers or cloud servers. In some instances, the account clustering module 102 can, in part or in whole, be implemented within or configured to operate in conjunction with a social networking system (or service), such as the social networking system 730 of FIG. 7. It should be understood that there can be many variations or other possibilities.

The account module 104 can be configured to facilitate acquiring a plurality of accounts associated with a set of features. In general, the plurality of accounts can refer to a plurality of users, entities, events, transactions, activities, and/or incidents, etc., that utilize, occur in, or are otherwise associated with one or more online services. In some instances, the plurality of accounts can include user accounts for a particular online service and/or transactions conducted by the user accounts within the particular online service. For example, the plurality of accounts can include a plurality of advertising accounts within a social networking system and/or a plurality of advertisement purchasing transactions conducted by the advertising accounts via the social networking system. Moreover, in order to purchase, publish, and/or promote advertisements, financial information and/or financial transactions are typically involved. As, each account in the plurality of accounts can, for instance, be associated with financial information (e.g., credit card information, bank account information, electronic/digital payment information, etc.) and/or with one or more financial transactions (e.g., payments, trades, redemptions, etc.).

As discussed above, the plurality of accounts can be associated with a set of features. Features can generally refer to properties, characteristics, attributes, traits, details, statistics, metadata, and/or other information associated with the plurality of accounts. In some embodiments, examples of the features can include, but are not limited to, at least one of an advertisement title feature, an advertisement quantity feature, an account age feature, a media identifier feature, an advertisement purchasing amount feature, a domain feature, a country Internet Protocol (IP) feature, a credit card feature, a country comparison feature, or a source Internet Protocol (IP) feature, etc. In some cases, each account in the plurality of accounts can be associated with a respective set of feature values for the set of features. For instance, each account in the plurality of accounts can have the same set of features, but each account can have different feature values for the features in the set. In some cases, such feature values for each account in the plurality can be determined, calculated, recognized, and/or otherwise acquired from an account database, a modeling system, and/or an account analytics system. It should be appreciated that many variations are possible.

In some instances, for example, a feature value for the advertisement title feature can describe a title of an advertisement to be purchased, promoted, or otherwise associated with via a particular account. A feature value for the advertisement quantity feature can indicate how many advertisements have been purchased, promoted, or otherwise associated with a particular account. An account age feature value can indicate how long a particular account has been active. A media identifier feature value can indicate a media (e.g., image, video, audio, etc.) hash identifier, a media classification, and/or a media fingerprint, etc., for an advertisement associated with a particular account. A advertisement purchasing amount feature value can indicate how much money is associated with the purchase of an advertisement via a particular account. A domain feature value can indicate the domain associated with a particular account. A country Internet Protocol (IP) feature value can indicate IP address information associated with a particular account. A credit card feature value can indicate credit card information associated with a particular account. A country comparison feature value can indicate comparative information about a source country and a target country associated with a particular account. A source Internet Protocol (IP) feature value can indicate source IP address information associated with a particular account. It is contemplated that all examples herein are provided for illustrative purposes and that there can be many variations or other possibilities.

The feature module 106 can be configured to facilitate processing, handling, and/or performing various tasks/operations associated with features. In some embodiments, the feature module 106 can be configured to facilitate receiving a selection for a subset of features out of the set of features. In one example, the subset of features can be manually selected, such as by a user, a reviewer, an analyst, etc. In another example, the subset of features can be automatically selected, such as based on machine learning, research, and/or analytics, etc.

In some embodiments, the set of features can include a significant amount (e.g., hundreds, thousands, etc.) of features. As such, it can be more efficient to select some of the features, such as the subset of features. In some cases, the subset of features can be selected to include features that are likely to be more relevant and/or interesting with respect to determining legitimacy classifications for the plurality of accounts. For instance, the subset of features can be selected to include those features that are more likely to reveal or indicate patterns, trends, commonalties, and/or similarities among various features. Furthermore, in some cases, the selection for the subset of features can be received dynamically by the feature module 106.

In some implementations, the feature module 106 can also be configured to facilitate determining or recognizing that two accounts out of the plurality of accounts have, within an allowable deviation, common feature values for the subset of features. In one example, if two accounts are respectively associated with two advertisement images that are the same (or substantially similar), then the two images can be hashed, classified, and/or recognized as having the same image identifier (or substantially similar identifiers) within a specified or given allowable image deviation. Thus, the advertisement image feature values for the two accounts can be the same (or substantially similar). In this example, the feature module 106 can determine or recognize that these two accounts have a common feature value for the advertisement image feature, which can be included in the selected subset of features. In another example, two accounts having feature values that fall within the same category or bucket (e.g., within a specified or given allowable categorical/bucket deviation) can be considered to have a common feature value. It should be understood that many variations are possible. In one instance, the feature module 106 can identify or select features with respect to which clustering is to be applied. The feature module 106 can filter the features as desired. Various feature combinations (representing edges) based on the identified features can be grouped. This can yield or return accounts (or account identifiers) connected by the edges represented via the feature combinations, which can result in clusters of accounts. Again, there can be many variations or other possibilities.

In addition, the cluster module 108 can be configured to facilitate generating a group of clusters based on the selection for the subset of features. In some cases, each cluster in the group of clusters can include a respective collection of nodes representing at least some of the plurality of accounts. In some implementations, the group of clusters can be generated by the cluster module 108 in real-time based on the selection for the subset of features, which can be dynamically received, as discussed above. The cluster module 108 will be discussed in more detail with reference to FIG. 2A.

Moreover, the legitimacy module 110 can be configured to facilitate determining whether a particular collection of nodes, included in at least one cluster out of the group of clusters, represents illegitimate accounts or legitimate accounts. For instance, if one node in a particular cluster is determined to be (or recognized as being) illegitimate, then other nodes in the particular cluster can also be determined to be illegitimate as well (and vice versa in some cases). More details regarding the legitimacy module 110 will be provided below with reference to FIG. 2B.

Furthermore, in some embodiments, the account clustering module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the account clustering module 102. It is contemplated that there can be many variations or other possibilities.

Figure 2A:
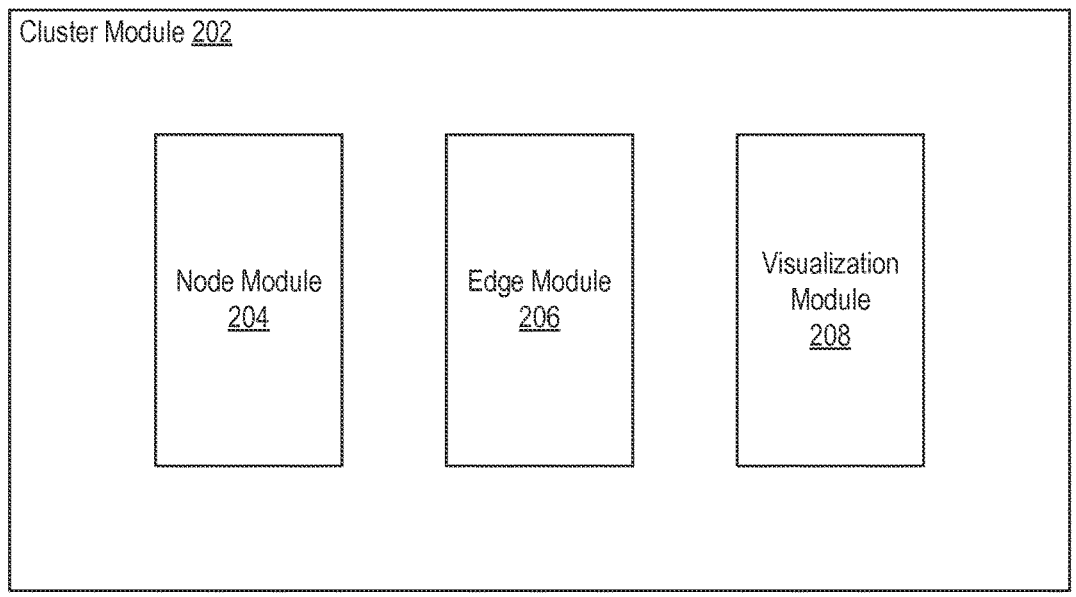
FIG. 2A illustrates an example cluster module configured to facilitate identifying illegitimate accounts based on clustering, according to an embodiment of the present disclosure.

FIG. 2A illustrates an example cluster module 202 configured to facilitate identifying illegitimate accounts based on clustering, according to an embodiment of the present disclosure. In some embodiments, the cluster module 108 of FIG. 1 can be implemented as the example cluster module 202. As shown in FIG. 2A, the cluster module 202 can include a node module 204, an edge module 206, and a visualization module 208.

As discussed previously, the cluster module 202 can facilitate generating the group of clusters based on the selection for the subset of features. Each cluster in the group of clusters can, for instance, be generated to include the respective collection of nodes representing at least some of the plurality of accounts. In some embodiments, the cluster module 202 can utilize the node module 204 to facilitate representing the plurality of accounts based on a plurality of nodes. For example, the node module 204 can utilize the plurality of nodes to represent the plurality of accounts. In some implementations, each account in the plurality of accounts can be represented by at least one node in the plurality of nodes.

Moreover, the cluster module 202 can utilize the edge module 206 to facilitate generating an edge between two nodes out of the plurality of nodes when the two nodes have, within an allowable deviation, common feature values for the subset of features. In some embodiments, the edge can be generated or created, by the edge module 206, between the two nodes when the two nodes are determined, by the node module 204 and/or the feature module 106 of FIG. 1, to have common feature values for each feature in the subset of features. In one example, if the subset of features includes an advertisement title feature, an advertisement quantity feature, and a media identifier feature, then the edge can be generated between the two nodes when it is determined that the two nodes have common advertisement title feature values (within a specified allowable title deviation), common advertisement quantity feature values (within a specified allowable advertisement quantity deviation, such as within a category or bucket), and common media identifier feature values (within a specified allowable identifier deviation).

Upon generating the edge between the two nodes to connect them, at least the two nodes can be included in (or form, represent, etc.) a particular cluster out of the group of clusters. In some cases, it can be determined that another node has, within the allowable deviation, the common feature values for the subset of features with respect to the two nodes. The edge module 206 can then generate respective edges between the other node and each of the two nodes. The other node can also be included in the particular cluster. As such, the particular cluster can be formed based on (i.e., based at least in part on) these three nodes that are interconnected by edges. Additional nodes that have, within the allowable deviation, the common feature values for the subset of features with respect to these nodes can have respective edges generated and can be included in the particular cluster as well. In some embodiments, the edge module 206 can generate edges for all nodes in the plurality of nodes that have common feature values for the subset of features. Since all nodes in the plurality of nodes that have common feature values for the subset of features can be connected by edges, each cluster in the group of clusters can include nodes that are fully connected with one another.

Furthermore, the cluster module 202 can utilize the visualization module 208 to facilitate generating a visualization for the group of clusters. In some embodiments, the visualization module 208 can cause the group of clusters to be generated based on a force-directed graph visualization process. In some cases, the visualization module 208 can cause the force-directed graph visualization process to include, for example, a Fruchterman-Reingold algorithm. Additionally, in some implementations, the visualization module 208 can, for example, cause certain nodes or clusters to be generated, presented, or displayed in different colors, such as based on legitimacy classifications for these nodes or clusters. As discussed, it is contemplated that all examples herein are provided for illustrative purposes and that many variations are possible.

Figure 2B:
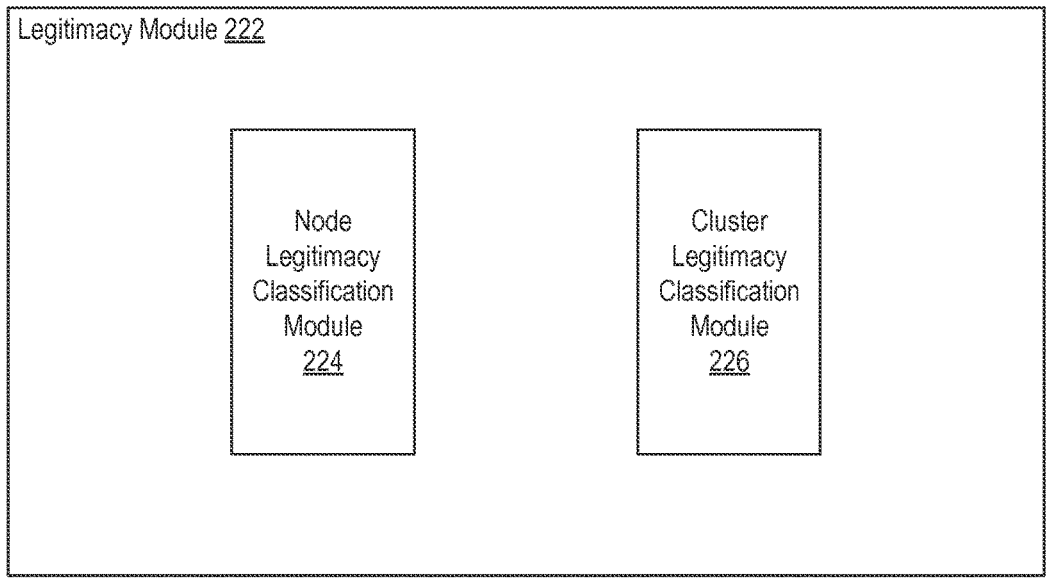
FIG. 2B illustrates an example legitimacy module configured to facilitate identifying illegitimate accounts based on clustering, according to an embodiment of the present disclosure.

FIG. 2B illustrates an example legitimacy module 222 configured to facilitate identifying illegitimate accounts based on clustering, according to an embodiment of the present disclosure. In some embodiments, the legitimacy module 110 of FIG. 1 can be implemented as the example legitimacy module 222. As shown in FIG. 2B, the legitimacy module 222 can include a node legitimacy classification module 224 and a cluster legitimacy classification module 226.

As discussed previously, the legitimacy module 222 can be configured to facilitate determining whether the particular collection of nodes, included in (or representing, forming, etc.) at least one cluster out of the group of clusters, represents illegitimate accounts or legitimate accounts. For instance, if one node in a particular cluster is determined to be (or recognized as being) illegitimate, then other nodes in the particular cluster can also be determined to be illegitimate as well (and vice versa in some cases).

In some implementations, determining whether the particular collection of nodes, included in the at least one cluster out of the group of clusters, represents illegitimate accounts or legitimate accounts can further comprise acquiring a first legitimacy classification for a first node in the at least one cluster. The legitimacy module 222 can utilize the node legitimacy classification module 224 to acquire (or determine, recognize, receive, etc.) the first legitimacy classification for the first node in the at least one cluster. In one example, the node legitimacy classification module 224 can acquire the first legitimacy classification for the first node based on manual review of the first node.

Moreover, the legitimacy module 222 can acquire a second legitimacy classification for at least a second node, in the at least one cluster, based on the first legitimacy classification for the first node. In some instances, the legitimacy module 222 can utilize the cluster legitimacy classification module 226 to acquire legitimacy classifications for all nodes in the at least one cluster. For example, the legitimacy classifications for all nodes in the at least one cluster can be based on the first legitimacy classification. In this example, if the first legitimacy classification for the first node in the at least one cluster indicates that the first node represents an illegitimate account, then the cluster legitimacy classification module 226 can determine or recognize that all nodes in the in the at least one cluster are associated with illegitimate accounts. As such, legitimacy determinations or classifications for accounts can be provided much more efficiently based on the disclosed technology. It should be appreciated that there can be many variations or other possibilities.

Figure 3:
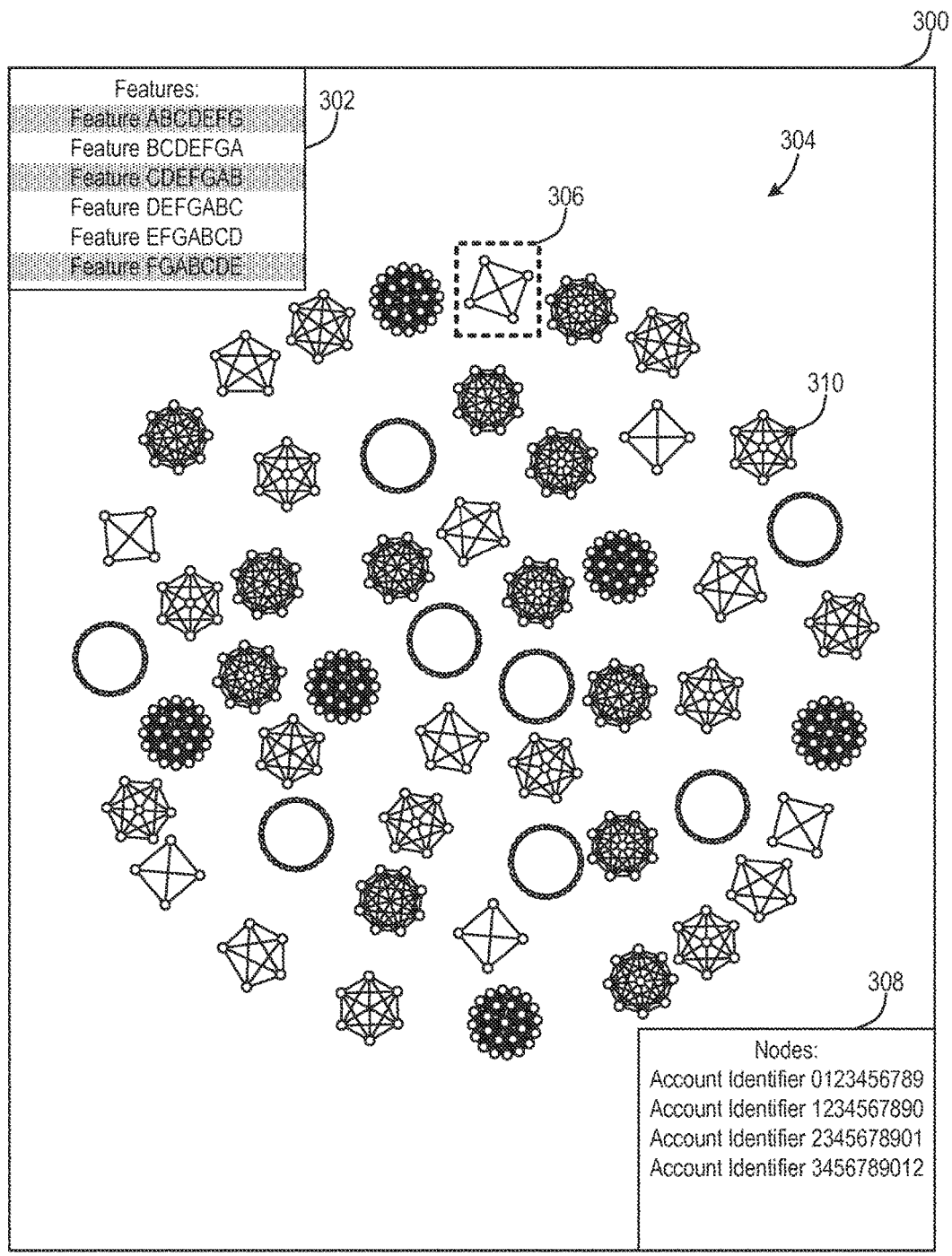
FIG. 3 illustrates an example interface associated with identifying illegitimate accounts based on clustering, according to an embodiment of the present disclosure.

FIG. 3 illustrates an example interface 300 associated with identifying illegitimate accounts based on clustering, according to an embodiment of the present disclosure. In some embodiments, the example interface 300 can include a first interface portion 302 configured to provide, present, and/or display a set of features associated with a plurality of accounts, which can be represented by a plurality of nodes, as discussed above. The first interface portion 302 can also illustrate a subset of features selected, such as by an analyst or a reviewer, out of the set of features. As shown, the selected subset of features (e.g., Feature ABCDEFG, Feature CDEFGAB, Feature FGABCDE) can, for instance, be highlighted in the first interface portion 302.

In the example of FIG. 3, a group of clusters 304 can be generated based on (i.e., based at least in part on) the selection of the subset of features. Moreover, in some implementations, a selection 306 of a particular cluster can be made to cause more details or information about the particular cluster to be shown. For example, when the selection 306 of the particular cluster has been made, a second interface portion 308 can provide identifying information (and/or other data) associated with each node in the particular cluster.

Furthermore, in some embodiments, a legitimacy classification for a node 310 within a cluster can be determined, recognized, received, or otherwise acquired. The disclosed technology can, in some cases, cause different nodes or clusters to be presented in different colors based on their properties. In this example, the node 310 can be determined, recognized, or otherwise known to be associated with an illegitimate account, such as based on one or more manual and/or automatic classification processes. As such, the node 310 can be presented in a color that is different from those presented for nodes that are associated with legitimate accounts and nodes that have yet to be classified. Again, it is contemplated that there can be many variations or other possibilities.

Figure 4:
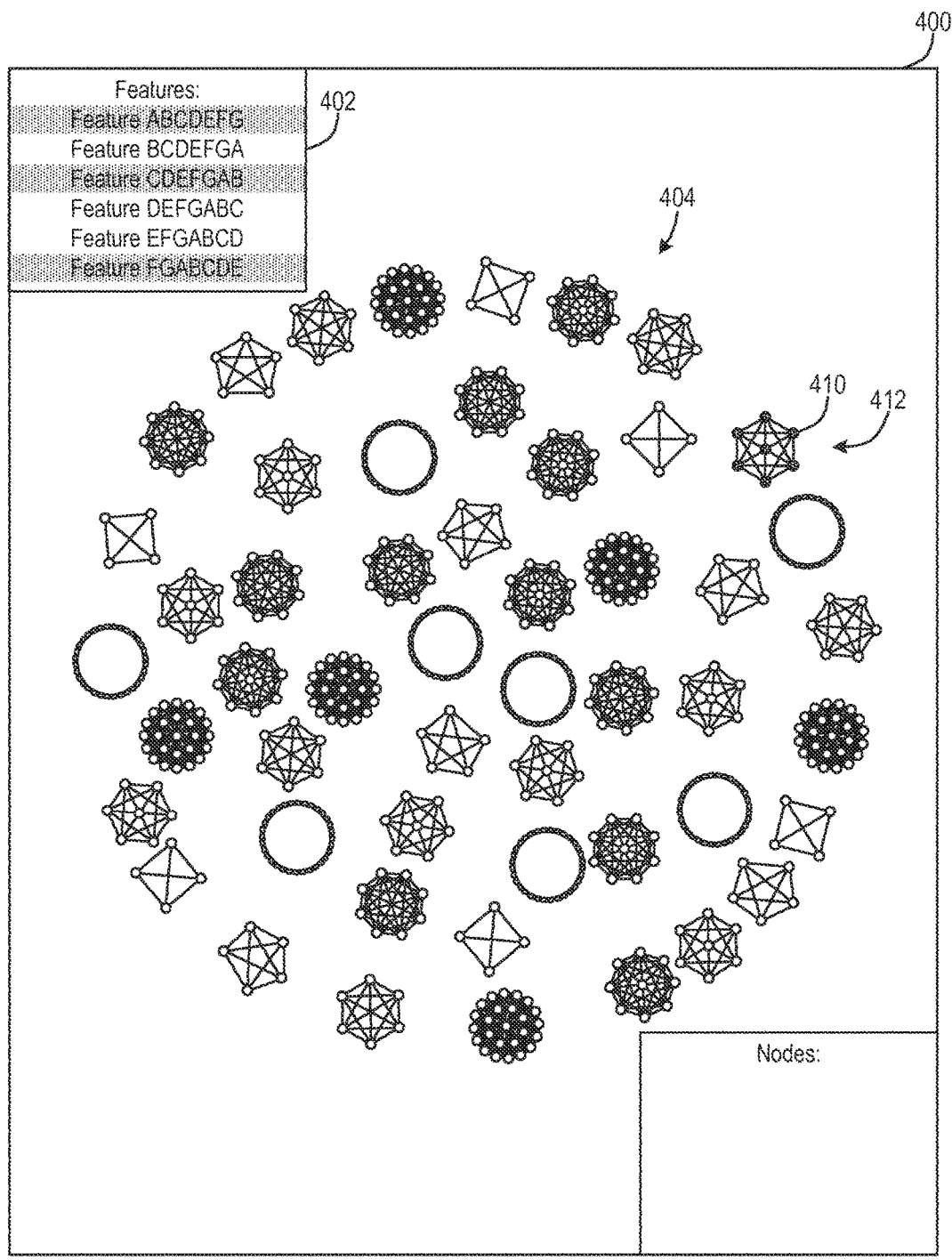
FIG. 4 illustrates an example interface associated with identifying illegitimate accounts based on clustering, according to an embodiment of the present disclosure.

FIG. 4 illustrates an example interface 400 associated with identifying illegitimate accounts based on clustering, according to an embodiment of the present disclosure. In some embodiments, the example interface 400 can correspond to the example interface 300 of FIG. 3. As shown in FIG. 4, the example interface 400 can include a first interface portion 402 configured to provide the set of features, including the subset of features from which the group of clusters 404 is generated.

As discussed previously, in some cases, a legitimacy classification for a particular node 410 in a particular cluster 412 can be determined, recognized, received, or otherwise acquired. Accordingly, the disclosed technology can determine or recognize that the particular cluster 412 and/or all nodes within the particular cluster 412 are to have the same legitimacy classification as that of the particular node 410. Therefore, the disclosed technology can provide legitimacy classifications for nodes (and their represented accounts) much more efficiently than individually reviewing each node or each account to determine its respective individual legitimacy classification. Moreover, the disclosed technology can present all nodes in the particular cluster 412 in the same color as that of the particular node 410. Again, it should be appreciated that many variations are possible.

Figure 5:
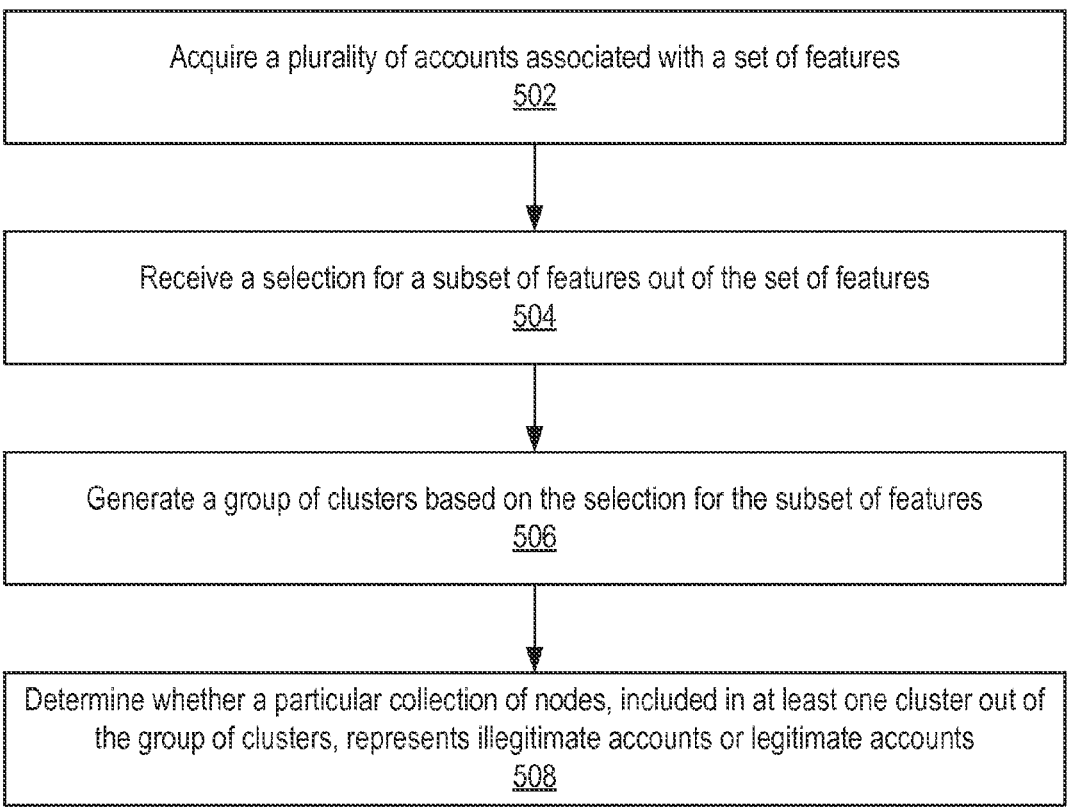
FIG. 5 illustrates an example method associated with identifying illegitimate accounts based on clustering, according to an embodiment of the present disclosure.

FIG. 5 illustrates an example method 500 associated with identifying illegitimate accounts based on clustering, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can acquire a plurality of accounts associated with a set of features. Each account in the plurality of accounts can be associated with a respective set of feature values for the set of features. At block 504, the example method 500 can receive a selection for a subset of features out of the set of features. At block 506, the example method 500 can generate a group of clusters based on the selection for the subset of features. Each cluster in the group of clusters can include (or be represented by, be formed by, be depicted by, etc.) a respective collection of nodes representing at least some of the plurality of accounts. At block 508, the example method 500 can determine whether a particular collection of nodes, included in at least one cluster out of the group of clusters, represents illegitimate accounts or legitimate accounts.

Figure 6:
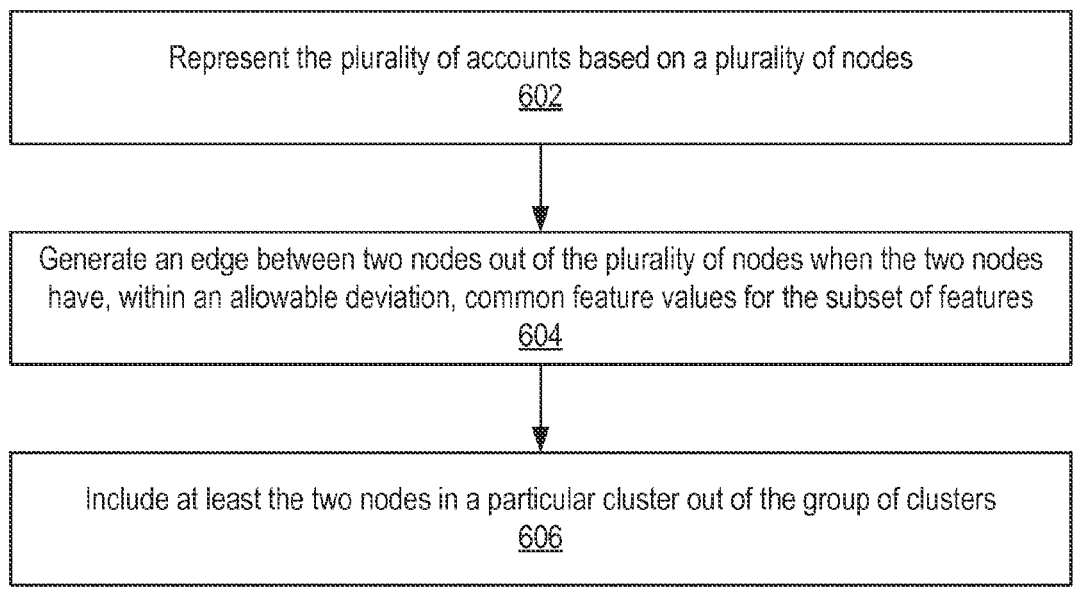
FIG. 6 illustrates an example method associated with identifying illegitimate accounts based on clustering, according to an embodiment of the present disclosure.

FIG. 6 illustrates an example method 600 associated with identifying illegitimate accounts based on clustering, according to an embodiment of the present disclosure. Again, it should be appreciated that there can be additional, fewer, or alternative steps performed in similar or alternative orders, or in parallel, within the scope of the various embodiments unless otherwise stated.

At block 602, the example method 600 can represent the plurality of accounts based on a plurality of nodes. At block 604, the example method 600 can generate an edge between two nodes out of the plurality of nodes when the two nodes have, within an allowable deviation, common feature values for the subset of features. At block 606, the example method 600 can include at least the two nodes in a particular cluster out of the group of clusters.

It is contemplated that there can be many other uses, applications, features, possibilities, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
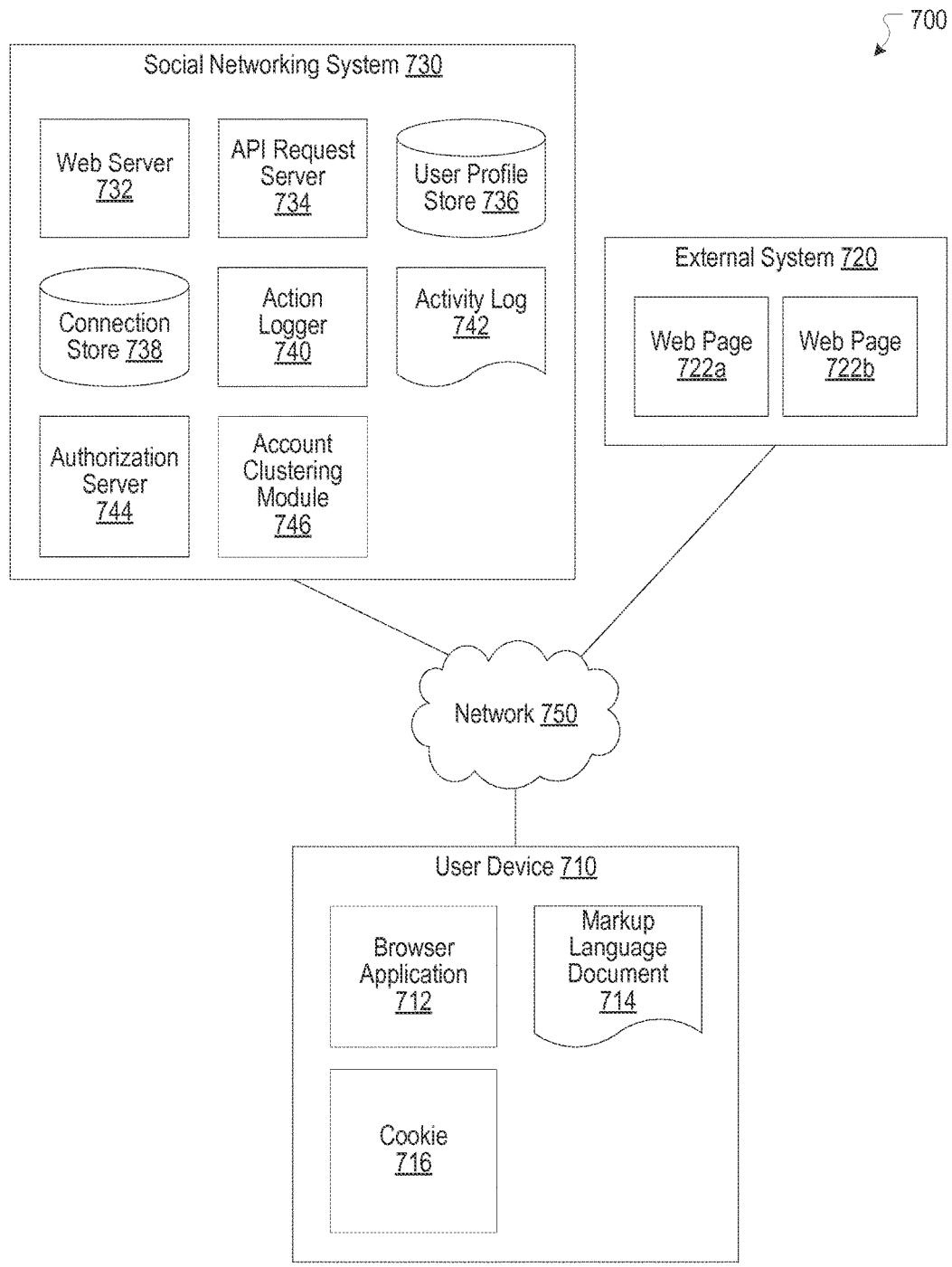
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include an account clustering module 746. The account clustering module 746 can, for example, be implemented as the account clustering module 102 of FIG. 1. As discussed previously, it should be appreciated that there can be many variations or other possibilities. For example, in some instances, the account clustering module 746 (or at least a portion thereof) can be included in the user device 710. Other features of the account clustering module 746 are discussed herein in connection with the account clustering module 102.

Hardware Implementation

Figure 8:
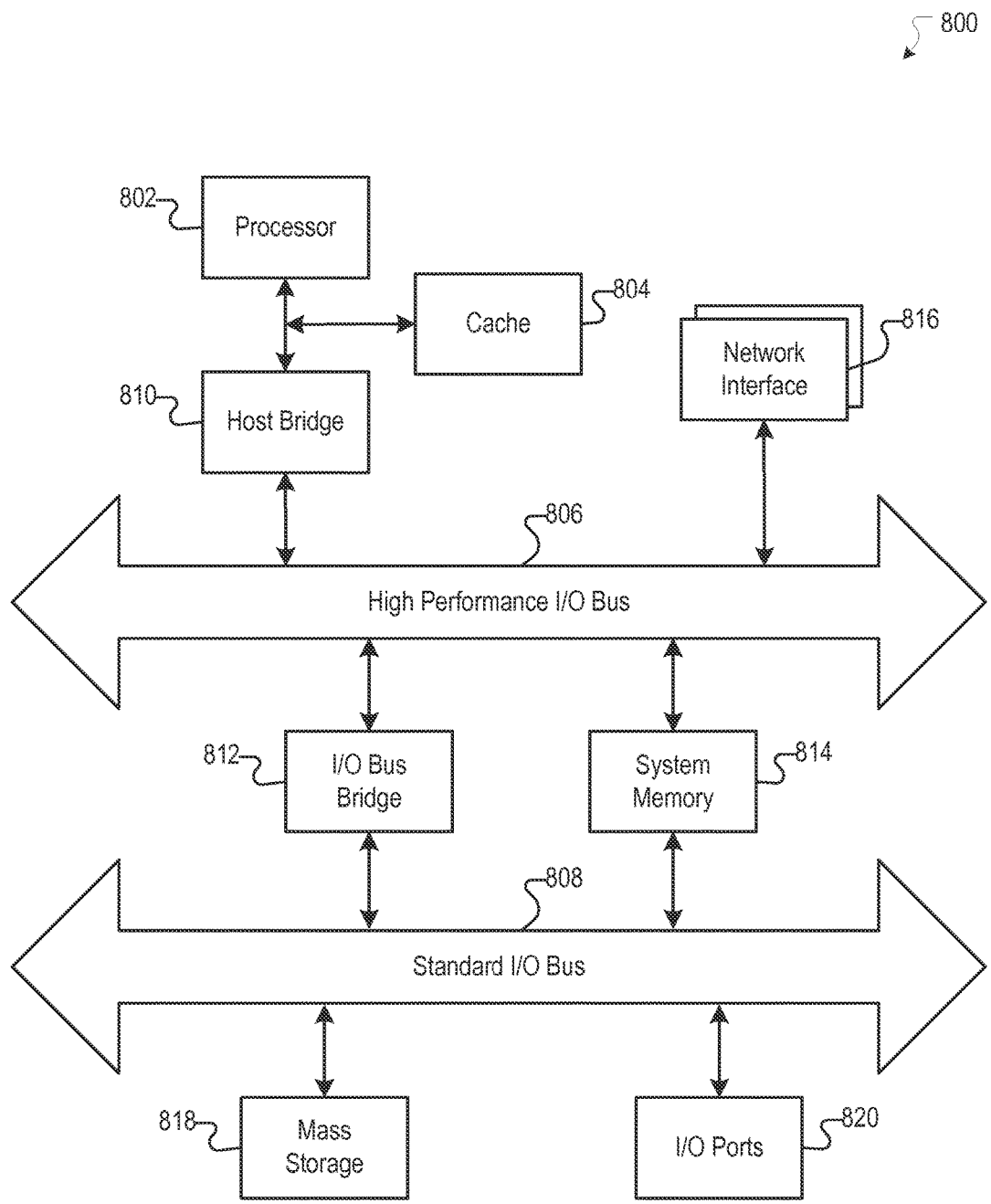
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. A computer-implemented method comprising:
acquiring, by a computing system, a plurality of accounts associated with a set of features, each account in the plurality of accounts being associated with one or more online services and a respective set of feature values for the set of features;

receiving, by the computing system, from a user, via a user interface, a selection for a subset of features out of the set of features, wherein the subset of features includes at least one of an advertisement title feature, an advertisement quantity feature, and an advertisement purchasing amount feature;

generating, by the computing system, a plurality of nodes to represent the plurality of accounts;

generating, by the computing system, edges between the plurality of nodes to generate a group of clusters based on the selection for the subset of features, each cluster in the group of clusters including a respective collection of nodes of the plurality of nodes representing at least some of the plurality of accounts;

providing, by the computing system, within the user interface, a visual depiction of the group of clusters;

determining, by the computing system, that a first node of a first cluster of the group of clusters represents an illegitimate account; and determining, by the computing system, that a second node of the first cluster represents an illegitimate account based on the determining that the first node represents an illegitimate account.

2. The computer-implemented method of claim 1, wherein the generating edges between the plurality of nodes to generate the group of clusters further comprises:

generating an edge between two nodes out of the plurality of nodes when the two nodes have, within an allowable deviation, common feature values for the subset of features; and including at least the two nodes in a particular cluster out of the group of clusters.

3. The computer-implemented method of claim 2, wherein the generating edges between the plurality of nodes to generate the group of clusters further comprises:

determining that another node has, within the allowable deviation, the common feature values for the subset of features with respect to the two nodes;

generating respective edges between the other node and each of the two nodes; and including the other node in the particular cluster.

4. The computer-implemented method of claim 1, wherein the determining that the first node of the first cluster of the group of clusters represents an illegitimate account and the determining that the second node of the first cluster represents an illegitimate account further comprises:

acquiring a first legitimacy classification for the first node of the first cluster; and acquiring a second legitimacy classification for at least the second node, of the first cluster, based on the first legitimacy classification for the first node.

5. The computer-implemented method of claim 4, wherein legitimacy classifications for all nodes in the first cluster are based on the first legitimacy classification.

6. The computer-implemented method of claim 1, wherein each account in the plurality of accounts is associated with at least one of: 1) financial information or 2) one or more financial transactions.

7. The computer-implemented method of claim 1, wherein the group of clusters is generated based on a force-directed graph visualization process.

8. The computer-implemented method of claim 7, wherein the force-directed graph visualization process includes a Fruchterman-Reingold algorithm.

9. The computer-implemented method of claim 1, wherein the set of features includes at least two of an advertisement quantity feature, an account age feature, an advertisement purchasing amount feature, a country Internet Protocol (IP) feature, a credit card feature, and a source Internet Protocol (IP) feature.

10. The computer-implemented method of claim 1, wherein the selection for the subset of features is received dynamically, and wherein the group of clusters is generated in real-time based on the selection for the subset of features.

11. A system comprising:

at least one processor; and a memory storing instructions that, when executed by the at least one processor, cause the system to perform:

acquiring a plurality of accounts associated with a set of features, each account in the plurality of accounts being associated with one or more online services and a respective set of feature values for the set of features;

receiving, from a user, via a user interface, a selection for a subset of features out of the set of features, wherein the subset of features includes at least one of an advertisement title feature, an advertisement quantity feature, and an advertisement purchasing amount feature;

generating a plurality of nodes to represent the plurality of accounts;

generating edges between the plurality of nodes to generate a group of clusters based on the selection for the subset of features, each cluster in the group of clusters including a respective collection of nodes representing at least some of the plurality of accounts;

providing, within the user interface, a visual depiction of the group of clusters;

determining that a first node of a first cluster of the group of clusters represents an illegitimate account; and determining that a second node of the first cluster represents an illegitimate account based on the determining that the first node represents an illegitimate account.

12. The system of claim 11, wherein the generating edges between the plurality of nodes to generate the group of clusters further comprises:

generating an edge between two nodes out of the plurality of nodes when the two nodes have, within an allowable deviation, common feature values for the subset of features; and including at least the two nodes in a particular cluster out of the group of clusters.

13. The system of claim 11, wherein the determining that the first node of the first cluster of the group of clusters represents an illegitimate account and the determining that the second node of the first cluster represents an illegitimate account further comprises:

acquiring a first legitimacy classification for the first node of the first cluster; and acquiring a second legitimacy classification for at least the second node, of the first cluster, based on the first legitimacy classification for the first node.

14. The system of claim 11, wherein the group of clusters is generated based on a force-directed graph visualization process.

15. The system of claim 11, wherein the set of features includes at least two of an advertisement quantity feature, an account age feature, an advertisement purchasing amount feature, a country Internet Protocol (IP) feature, a credit card feature, and a source Internet Protocol (IP) feature.

16. A non-transitory computer-readable storage medium including instructions that, when executed by at least one processor of a computing system, cause the computing system to perform a method comprising:
- acquiring a plurality of accounts associated with a set of features, each account in the plurality of accounts being associated with one or more online services and a respective set of feature values for the set of features;
- receiving, from a user, via a user interface, a selection for a subset of features out of the set of features, wherein the subset of features includes at least one of an advertisement title feature, an advertisement quantity feature, and an advertisement purchasing amount feature;
- generating a plurality of nodes to represent the plurality of accounts;
- generating edges between the plurality of nodes to generate a group of clusters based on the selection for the subset of features, each cluster in the group of clusters including a respective collection of nodes representing at least some of the plurality of accounts;
- providing, within the user interface, a visual depiction of the group of clusters;
- determining that a first node of a first cluster of the group of clusters represents an illegitimate account; and
- determining that a second node of the first cluster represents an illegitimate account based on the determining that the first node represents an illegitimate account.

17. The non-transitory computer-readable storage medium of claim 16, wherein the generating edges between the plurality of nodes to generate the group of clusters further comprises:
- generating an edge between two nodes out of the plurality of nodes when the two nodes have, within an allowable deviation, common feature values for the subset of features; and
- including at least the two nodes in a particular cluster out of the group of clusters.

18. The non-transitory computer-readable storage medium of claim 16, wherein the determining that the first node of the first cluster of the group of clusters represents an illegitimate account and the determining that the second node of the first cluster represents an illegitimate account further comprises:
- acquiring a first legitimacy classification for the first node of the first cluster; and
- acquiring a second legitimacy classification for at least the second node, of the first cluster, based on the first legitimacy classification for the first node.

19. The non-transitory computer-readable storage medium of claim 16, wherein the group of clusters is generated based on a force-directed graph visualization process.

20. The non-transitory computer-readable storage medium of claim 16, wherein the set of features includes at least two of an advertisement quantity feature, an account age feature, an advertisement purchasing amount feature, a country Internet Protocol (IP) feature, a credit card feature, and a source Internet Protocol (IP) feature.

* * * * *